United States Patent
Sayko

(10) Patent No.: US 9,131,067 B2
(45) Date of Patent: Sep. 8, 2015

(54) SYSTEM AND METHOD FOR OUT-OF-BAND COMMUNICATION WITH CONTACT CENTERS

(71) Applicant: GENESYS TELECOMMUNICATIONS LABORATORIES, INC., Daly City, CA (US)

(72) Inventor: Slava Sayko, Walnut Creek, CA (US)

(73) Assignee: GENESYS TELECOMMUNICATIONS LABORATORIES, INC., Daly City (*) Notice: Subject to any disclaimer, the term of this patent is extended or adjusted under 35 U.S.C. 154(b) by 0 days.

(21) Appl. No.: 13/669,288

(22) Filed: Nov. 5, 2012

(65) Prior Publication Data

US 2014/0126708 A1    May 8, 2014

(51) Int. Cl.
*H04M 3/00* (2006.01)
*H04M 5/00* (2006.01)
*H04M 11/00* (2006.01)

(52) U.S. Cl.
CPC .................. *H04M 11/00* (2013.01)

(58) Field of Classification Search
CPC ..... H04M 3/51; H04M 3/5175; H04M 3/523; H04M 11/00; H04M 3/42042; H04M 7/006
USPC ............... 379/265.01, 265.09, 265.11, 266.1, 379/93.01, 93.12
See application file for complete search history.

(56) References Cited

U.S. PATENT DOCUMENTS

| | | | |
|---|---|---|---|
| 6,493,447 B1 | 12/2002 | Goss et al. | |
| 6,697,481 B2 * | 2/2004 | Matsumoto | 379/265.09 |
| 7,623,650 B2 * | 11/2009 | Dalton et al. | 379/265.01 |
| 7,636,348 B2 | 12/2009 | Bettis et al. | |
| 7,929,952 B2 | 4/2011 | Kelly et al. | |
| 2001/0038624 A1 * | 11/2001 | Greenberg et al. | 370/352 |
| 2004/0039775 A1 | 2/2004 | Yoshida | |
| 2005/0002514 A1 | 1/2005 | Shafiee et al. | |
| 2005/0141694 A1 | 6/2005 | Wengrovitz | |
| 2007/0061468 A1 | 3/2007 | Kelly et al. | |
| 2007/0116238 A1 | 5/2007 | Jacobi et al. | |
| 2007/0287430 A1 * | 12/2007 | Hosain et al. | 455/414.1 |
| 2009/0187455 A1 | 7/2009 | Fernandes et al. | |
| 2010/0158236 A1 | 6/2010 | Chang et al. | |
| 2012/0190333 A1 * | 7/2012 | Portman et al. | 455/411 |
| 2012/0278115 A1 | 11/2012 | Acharya et al. | |
| 2012/0297031 A1 | 11/2012 | Danielsson Fan et al. | |
| 2012/0320903 A1 | 12/2012 | Ilagan | |

(Continued)

OTHER PUBLICATIONS

Jennings, C. et al., *RTCWeb Offer/Answer Protocol (ROAP) draft-jennings-rtcweb-signaling-01*, Network Group, Internet Draft expired on May 2, 2012, IEFT Trust, 2011, 11 pages.

(Continued)

*Primary Examiner* — Quoc D Tran
(74) *Attorney, Agent, or Firm* — Christie, Parker & Hale, LLP

(57) ABSTRACT

A method for connecting a website user to a contact center includes: establishing a communication channel between a user and an agent of the contact center, the communication channel comprising a voice communication channel; establishing a supplemental channel between the user and the contact center for exchanging data between the user and the contact center; and storing the data exchanged in the supplemental channel in association with the communication channel.

20 Claims, 10 Drawing Sheets

(56) References Cited

U.S. PATENT DOCUMENTS

| | | |
|---|---|---|
| 2012/0320904 A1 | 12/2012 | Ilagan |
| 2012/0320905 A1 | 12/2012 | Ilagan |
| 2012/0324375 A1* | 12/2012 | Mathews ...................... 715/760 |
| 2014/0095596 A1 | 4/2014 | Singh |
| 2014/0126714 A1 | 5/2014 | Sayko |

OTHER PUBLICATIONS

International Search Report and Written Opinion for PCT/US2013/068556, mailed on Feb. 21, 2014, 16 pages.

* cited by examiner

US 9,131,067 B2

SYSTEM AND METHOD FOR OUT-OF-BAND COMMUNICATION WITH CONTACT CENTERS

FIELD

Embodiments of the present invention are directed to systems and methods for operating contact centers, and more particularly, to systems and methods for communicating with users using web browser based communication channels.

BACKGROUND

In the field of customer communications and services, an organization such as a retail company, a service company, or a non-profit organization may operate a website for providing information to customers and clients and/or for providing an entry point of communication with a contact center. In addition to the website, the organization may also operate a contact center (e.g. customer service or sales contact center) staffed by people who communicate with customers via a telephone or other audio/visual communication channel, interactive text chat systems, short message service (SMS), social media, cobrowsing, email, letters, fax, etc.

Generally, visitors to an organization's website are presented with information and opportunities for contacting representatives of the organization at the contact centers. These opportunities are typically presented as toll-free numbers (e.g., "1-800" numbers) for voice communications and/or chat boxes or windows integrated into a web page for real-time text-based communications. In some circumstances, a user is given the opportunity to fill out a form to indicate what they would like to speak about and to provide their telephone number for a representative of the organization to call the user (either immediately or at a designated time) using the public switched telephone network (PSTN).

However, operating toll-free numbers and maintaining a sufficiently large number of PSTN lines can often be expensive for organizations. In addition, voice communication over a PSTN connection is generally limited to audio and is substantially separate from and independent of the particular browser session currently being used by the caller.

Many organizations often use Data Network Telephony (DNT) or "computer-simulated telephony" to provide increased flexibility in handling higher numbers of calls through the use of shared, connectionless data networks such as the Internet. In such DNT systems, high loads can be handled by, for example, gracefully degrading call quality during peak usage through Quality of Service (QoS) mechanisms. For example, a DNT system may be implemented in part using telephones and gateways based on a Session Initiation Protocol (SIP), as described, in part, in Internet Engineering Task Force (IETF) Request for Comments (RFC) 2543, 3261, and 3262.

Whether the contact centers use PSTN lines, DNT connections, other types of telephonic communication systems, or combinations thereof, the contact centers typically include some system for routing incoming calls to the appropriate parties. Such a system may include an interactive voice response (IVR) system. The call can be connected to an IVR either before reaching the contact center switch, such as at the service control point (SCP) level or after reaching the contact center switch, such as through contact center routing means. During an IVR interaction, a voice application (or a chain of voice applications) is played for the caller and the caller interacts with menu options that are played by the voice application (e.g., "For new sales, press 1. For product support, press 2."). Other IVR systems may also or alternatively provide voice recognition systems (e.g., "Which flight would you like to know the status of? You can say the flight number or enter it on your keypad."). Interaction with such enunciated voice menus may often be difficult. This may be due in part to confusion because of the recitation of many options presented serially to the caller through the voice interface. Often a caller replays the menu and listens to the available options multiple times before selecting an option. This creates delay in the system that could lead to delays in call processing and to reductions in call processing efficiency, and may sometimes result in callers abandoning calls due to frustration.

Accordingly, what is desired are economical systems and methods for customers to communicate with agents at contact centers and systems and methods for determining user intentions for routing calls to particular agents.

SUMMARY

According to one embodiment of the present invention, a method for connecting a website user to a contact center includes: establishing a communication channel between a user and an agent of the contact center, the communication channel comprising a voice communication channel; establishing a supplemental channel between the user and the contact center for exchanging data between the user and the contact center; and storing the data exchanged in the supplemental channel in association with the communication channel.

The method may further include receiving a call request via a website accessed by the user via a web browser, wherein the communication channel is established with a media engine integrated into the web browser.

The text-based chat may be conducted between the user and the agent.

The screen sharing may be conducted between the user and the agent.

The information may be transferred between the user and the agent using web forms.

The communication channel and the supplemental channel may be associated with a single session identifier.

The establishing the communication channel may include requesting information via the supplemental channel.

The requesting information may include transmitting a web-based form to a web browser associated with the single session identifier.

The supplemental channel may include a socket connection.

The establishing the communication channel may include: receiving information from the website user via the supplemental channel; and identifying the agent of the contact center based on the information.

The information may include a response to a web-based form.

According to another embodiment of the present invention, a system for providing supplemental media and data exchange in a contact center includes: a call server configured to establish a plurality of communication channels between a plurality of users and a plurality of agents of the contact center; a routing server configured to route a plurality of requests for connections to the plurality of agents of the contact center; a supplemental application server configured to establish a plurality of supplemental communication channels for exchanging data between the users and the contact center; and a database for storing the data exchanged via the supplemental channel in association with the communication channel.

The call server may be configured to receive a plurality of call requests via a website accessed by the users, wherein the communication channel is established with a media engine integrated into a web browser used by one or more of the users.

Each of the communication channels may be associated with corresponding ones of the supplemental communication channels and each of the communication channels and its corresponding supplemental communication channels may be associated with a single session identifier, the single session identifier being distinct from a session identifier associated with another of the communication channels.

The supplemental application server may be configured to provide a text-based chat channel between the user and the agent.

The supplemental application server may be configured to provide a screen sharing channel between the user and the agent.

The supplemental application server may be configured to receive responses to web forms from the user.

The routing server may be further configured to route requests to the agents using routing information received from the supplemental application server.

The supplemental application server may be further configured to receive routing information from a plurality of web browsers associated with the users via the supplemental communication channels.

Each of the supplemental channels may include a socket connection.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
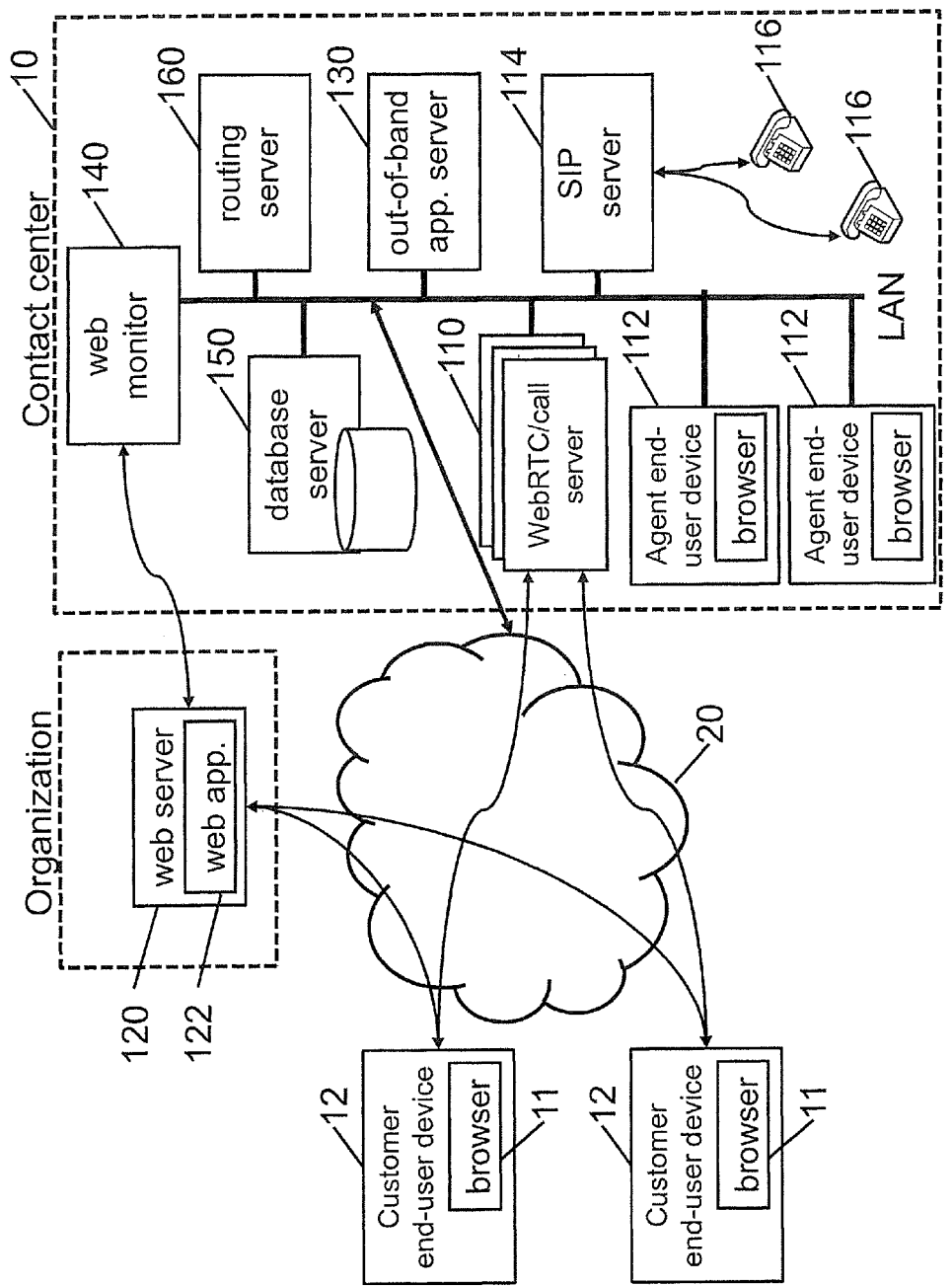
FIG. 1 is a block diagram of a system for web browser-based communication between users and customer contact centers according to one exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Exemplary embodiments of the present invention are directed to a system and method for establishing one or more communications channels with visitors to a website and a customer service representative (also referred to as an agent) using a web browser-based communication system. Such a system may be, for example, a Web real-time communication (WebRTC) system. WebRTC, which is also known as RTCWeb, enables a web browser to provide real-time communications (RTC) capabilities via JavaScript application programming interfaces (APIs) without requiring a user to actively download and install additional software and essentially makes bidirectional media processing and media coding technologies available in every browser. WebRTC technology puts a media engine into a browser or other elements of client devices. The media engine is the technology that manages microphones, cameras, and speakers and gets audio and video onto and off the interne. Thus, a visitor to the website desiring to speak to an agent simply actuates a call button displayed on the website, and a voice and/or video connection is formed between the visitor and an agent over, e.g. the Internet, without requiring that the visitor install any standalone applications or browser plug-in. The visitor also need not leave his/her current web browsing session and initiate a separate call session for engaging in a web browser based voice communication with the agent.

In one exemplary embodiment of the present invention, the user's activity on the website is monitored and information derived from monitoring the activity is used to determine whether or not to offer a live agent (e.g., a live communication with a customer service representative). If offered a live contact, the user may choose to speak to an agent (e.g., via text chat, telephone, WebRTC, or another teleconferencing service). The organization may route the user to an agent based on the user's prior activity on the website. For example, a first user looking primarily at a particular category of products (e.g., laptops) available for sale on the website would be directed to a sales agent with specialized knowledge of that category. As another example, a second user browsing portions of the website associated with troubleshooting problems associated with a particular product would be routed to a customer support agent such as a technical support agent. As a third example, a customer browsing a Spanish or Chinese version of the website may be routed to a Spanish or Chinese speaking customer service representative, respectively.

According to one exemplary embodiment of the present invention, a user may utilize an out-of-band (OOB) or supplemental channel for providing and receiving additional information to and from agents and end users before, during, and/or after a call, e.g., by telephone, WebRTC, or other voice over IP communication channel. In some embodiments, the OOB channel is dynamically offered by the contact center through the web server such that the decision to offer the OOB channel is made by the contact center and the user is provided the option to accept or ignore this channel. According to one exemplary embodiment, the OOB or supplemental channel may include any communication channel which is logically linked to the real time communication channel used for video and/or audio conversation between agents and end users but may be separate from the real time communication channel with respect to the protocol and transmission. For example, the display of the OOB channel data could be either separated from or grouped with the real time communication display.

According to one embodiment of the present invention, the OOB channel is used to display of pictures or movies, or a graphical presentation of an IVR selection menu. In some embodiments, the additional information may be received via the OOB channel after establishing a call but before connecting the call with an agent. In other embodiments, when the additional information is received via the OOB channel before establishing a call, it may be used to assist in routing the user to an appropriate agent.

In some embodiments, when the customer initiates a call using WebRTC, the contact center actively initiates or offers an OOB or supplemental channel to the user to, for example, show the graphical presentation of the IVR menu and for the agent to push content to the user. For example, according to one exemplary embodiment of the invention, the OOB channel may also be a text chat window where the additional information is exchanged between agents and end users via text chat. The OOB channel may also be, for example, a medium for sharing images (e.g., screenshots), recorded videos, documents (e.g., tutorials and order forms), links to other web pages, and/or a medium for sharing screens (e.g., using remote desktop technology such as remote framebuffer, Microsoft® Remote Desktop Services®, and other similar technologies). The OOB channel may also provide a backup communication channel if WebRTC is unreliable due to an unstable a poor Internet connection. Furthermore, the OOB channel can provide data without being restricted by quality of service (QoS) requirements that may be in place for data that is transferred in an in-band channel, such as a WebRTC channel.

In some exemplary embodiments, in addition or in lieu of any information provided via the OOB channel, the agents may also be with supplied information regarding the user's browsing history on the organization's website and, if available, the users' responses to web browser-based forms, in order to provide the agent with a better understanding of the issues the user may be facing.

FIG. 1 is a block diagram of a system for web browser-based communication system between web users and customer contact centers according to one exemplary embodiment of the present invention. A user or customer may use a web browser 11 installed in an end-user device 12 to access a web server 120 via a data communications network 20 such as, for example, the Internet. The end-user device 12 may be a standard desktop or portable computer, tablet, smartphone, television, game console, or any other device capable of running a web browser as is conventional in the art. The web server 120 may be configured to host a web application or website 122 that provides information such as features and specifications of products or services available from an organization and/or technical support for those products or services. The web server 120 may also be configured to drive the WebRTC sessions and the OOB communication channel to the web browser 11 by supplying, for example, JavaScript code.

According to one exemplary embodiment, a contact center 10 may be operated by the organization or by another entity. The contact center 10 may, according to one example, include a WebRTC/call server or gateway 110 for receiving incoming requests to establish WebRTC calls, and a routing server 160 for routing incoming requests from the WebRTC/call server 110 to appropriate agents at the contact center. According to one embodiment, the WebRTC/call server 110 is configured to receive and establish WebRTC sessions and acts as a gateway between WebRTC and SIP. The WebRTC call is converted into SIP and sent to the SIP server 114, and there it is picked up by the router which instructs the SIP server 114 where to route the call to. If the agent is SIP enabled, then the call goes directly from the SIP server 114 to the agent. If the agent is WebRTC enabled, then the SIP server passes the call back to the WebRTC/call server 110 and the call is sent from there to the agent. The agents may be reached at one or more agent devices 112 which may include, for example, desktop or portable computers, tablets, smartphones, or any other device capable of running a web browser, or at agent telephones 116. The agent telephones 116 may be, for example, SIP phones for engaging in voice-over-IP (VoIP) communication via, for example, a SIP server 114.

According to one exemplary embodiment, the contact center also includes a web monitor 140 for monitoring customer's activity on the web server 120. In other embodiments, the web monitor 140 may be hosted by the organization and may be a software module running on the web server 120 or on a separate server. Systems and methods for monitoring a customer or web visitor are described in more detail in, for example, in U.S. application Ser. No. 13/293,575 filed in the United States Patent and Trademark Office on Nov. 10, 2011, and titled "SYSTEM FOR INTERACTING WITH A WEB VISITOR," the entire disclosure of which is incorporated herein by reference.

The contact center may also include a database server 150 for storing information relating to the customers and their interactions with the organization and the contact center. Such information may include, for example, historical data collected by prior agents regarding prior calls and prior issues or requirements, contact information such as names, addresses, and telephone numbers, lists of products owned by the customer, and the like.

In some exemplary embodiments, the contact center also includes an OOB application server 130 separate from the web server 120 configured to provide OOB or supplemental communications channels to the customer end-user devices 12. For example, in some embodiments the web server 120 is configured to handle and supply functionality related to WebRTC calls between the web browser 11 and the WebRTC/call server 110 while the OOB application server 130 is configured to provide code and/or media associated with the out-of-band communication channels. In other embodiments, the out-of-band communication channel functionality may be provided by the web server 120. These out-of-band communications channels may include, without limitation, channels that provide web browser-based forms, text chats, video, and other types of media that may typically be presentable by a web server to a customer via a web browser. For example, text-based chat may be used for increased accuracy when communicating addresses, email addresses, and credit card payment information, and to provide URLs to web pages to answer user questions. The OOB channels may also be used for video tutorials, official documentation, and screen sharing for demonstrating usage. OOB channels may also provide some redundancies in the case of poor connections in the real-time communication channel. In this regard, the WebRTC/call server 110 may assist in establishing socket connections between the customer end-user device 12 and the out-of-band application server 130 and/or the agent device 112.

According to one exemplary embodiment of the invention, an end user viewing a website provided by the web application 122 (referred to as the website visitor) may decide to speak to an agent for asking questions about products viewed on the website, engage in a particular transaction, or for receiving any other assistance from the agent. A conventional method for initiating this conversation is by dialing a telephone number (e.g., a toll-free or "1-800" number). The user may also request (e.g. via email) that the agent call the customer at a particular telephone number, or may engage in a text-based chat with the agent via the web browser 11. According to exemplary embodiments of the present invention, the end user may, in addition or in lieu of these conventional contact mechanisms, establish a WebRTC call with an agent via the web browser. Using WebRTC allows a user to participate in a real time voice conversation with an agent, thereby increasing their engagement, while reducing the costs associated with operating a contact center reliant on standard PSTN telephone systems. In addition, WebRTC calls may be associated with particular browser sessions, thereby simplifying the task of associating OUB channels with the "in-band" audio/video channel.

The various servers 110, 114, 130, 150, 160, and web monitor of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2A:
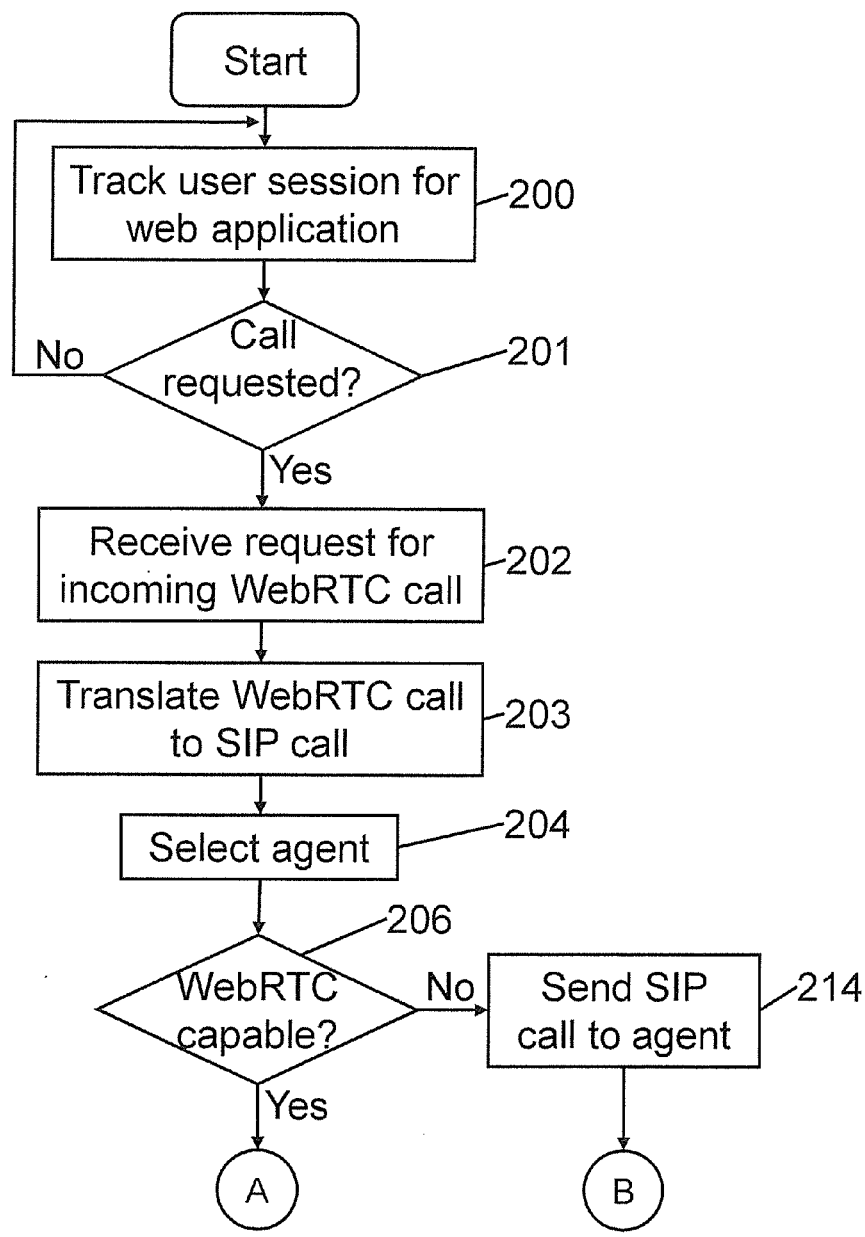
FIGS. 2A and 2B are flowcharts of a process for connecting a web application user to a contact center agent according to one exemplary embodiment of the present invention.
Figure 2B:
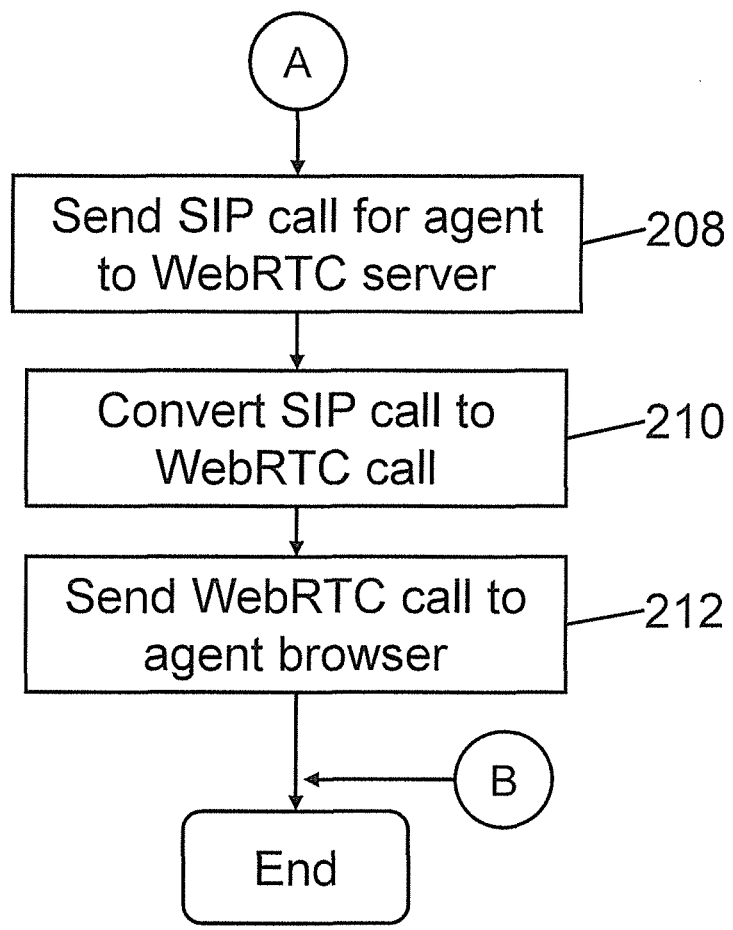

FIGS. 2A and 2B are flowcharts of a process for connecting a web application user to a contact center agent according to one exemplary embodiment of the present invention. The process may be described in terms of one or more software routines executed by one or more processors based on computer program instructions stored in memory. A person of skill in the art should recognize, however, that the process may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

The process starts, and in step 200, the web monitor 140 tracks a user's session on a web application, such as, for example, the web application 122 provided by the web server 120. In this regard, a user invokes the browser 11 in the end-user device 12 to access the web application 122. The user may interact with the website/application by navigating though the pages of the website, selecting different links, submitting information, initiating transactions, or performing other actions as will be apparent to a person of skill in the art. The navigating of the various pages and the actions performed while visiting the website is tracked by the web monitor 140 as discussed in further detail in the above-referenced U.S. application Ser. No. 13/293,575. For example, while using the web application 122, a session identifier (a "session ID" or "session token" or, alternatively, login information associated with a user account) may be granted and associated with the customer end-user device 12 and/or the web browser running thereon, thereby allowing the web application 122 and other servers operated by the organization and/or the contact center to identify the user and to track the user's activity.

According to one exemplary embodiment, the web monitor 140 monitors/tracks the user's activity on the web application 122 to determine the intent or goals of the user while using the website (e.g., determining which category of products or services the user is interested in purchasing or determining the problem that the user would like to resolve) and associate this computed result with the user's session identifier. According to one exemplary embodiment, the web monitor 140 supplies to the routing server 160 information regarding the monitored activity of the user as associated with a particular session identifier.

While perusing the information on the website, the user may decide to speak to a customer service representative to obtain information or to ask for assistance in regards to a product or service being viewed. According to one example, the visitor may transmit the command to initiate the call by selecting a "call" button. According to one exemplary embodiment, the web application interprets the command as a command to initiate a browser based real time communication channel (referred to as a WebRTC call).

In step 202, the WebRTC/call server 110 receives the request to initiate the WebRTC call with a customer service representative. According to one exemplary embodiment, the request to initiate the call includes, for example, a Session Description Protocol (SDP) offer (as described in Internet Engineering Task Force (IETF) Request for Comments (RFC) 3264), which may include an Interactive Connectivity Establishment (ICE) candidate (as described in IETF RFC5245). The offer may include information such as a session identifier for identifying the requested session, and an IP address of the requesting end-user device.

In step 203, the WebRTC/call server 110 translates the WebRTC call to a SIP call using a SIP protocol, and sends a request (e.g. via an INVITE message) to the SIP server 114. Although a SIP call is used as an example, a person of skill in the art should recognize that a different protocol for VoIP communication may be used instead of SIP, such as, for example, H.323.

In other embodiments of the present invention, the web server 120 may provide the JavaScript that drives WebRTC functionality to the web browser. When the user activates a WebRTC session, the other party is matched to the WebRTC/call server 110. The WebRTC/call server 110 acts as a proxy or gateway for connection to the actual (end-)party of the user's WebRTC session, where the actual party may be, for example, a WebRTC enabled agent or a SIP enabled agent.

In step 204, the routing server 160 is invoked by the SIP server 114 for identifying an appropriate agent to route the call.

In step 206, a determination is made by, for example, the SIP server 114 in combination with the router, as to whether the identified agent is associated with a WebRTC capable browser. If the answer is NO, the SIP server transmits, in step 214, a SIP call to the selected agent. For example, the SIP server 114 transmits a SIP INVITE message to the selected agent's SIP device (e.g. telephone 116). The selected agent thus communicates with the website visitor via his or her SIP device, while the website visitor communicates with the selected agent via the web browser 111. In some exemplary embodiments, this WebRTC call (referred to as an in-band connection) is used solely for voice (e.g., audio only). In other exemplary embodiments, the connection includes both audio and video. Referring again to step 206, if a determination is made that the selected agent has a WebRTC-capable browser, the SIP server 114 transmits a SIP call for the agent to the WebRTC/call server 110. In this regard, the SIP server 114 transmits a SIP INVITE message including an address of the selected agent.

In step 210, the WebRTC/call server 110 converts the SIP call to a WebRTC call. In this regard, the WebRTC/call server 110 acts as a bidirectional gateway between WebRTC and SIP based calls.

In step 212, the WebRTC/call server 110 sends the WebRTC call to the browser in the selected agent's device 112. Thus, both the agent and the website visitor engage in communication via their respective web browsers.

Figure 3:
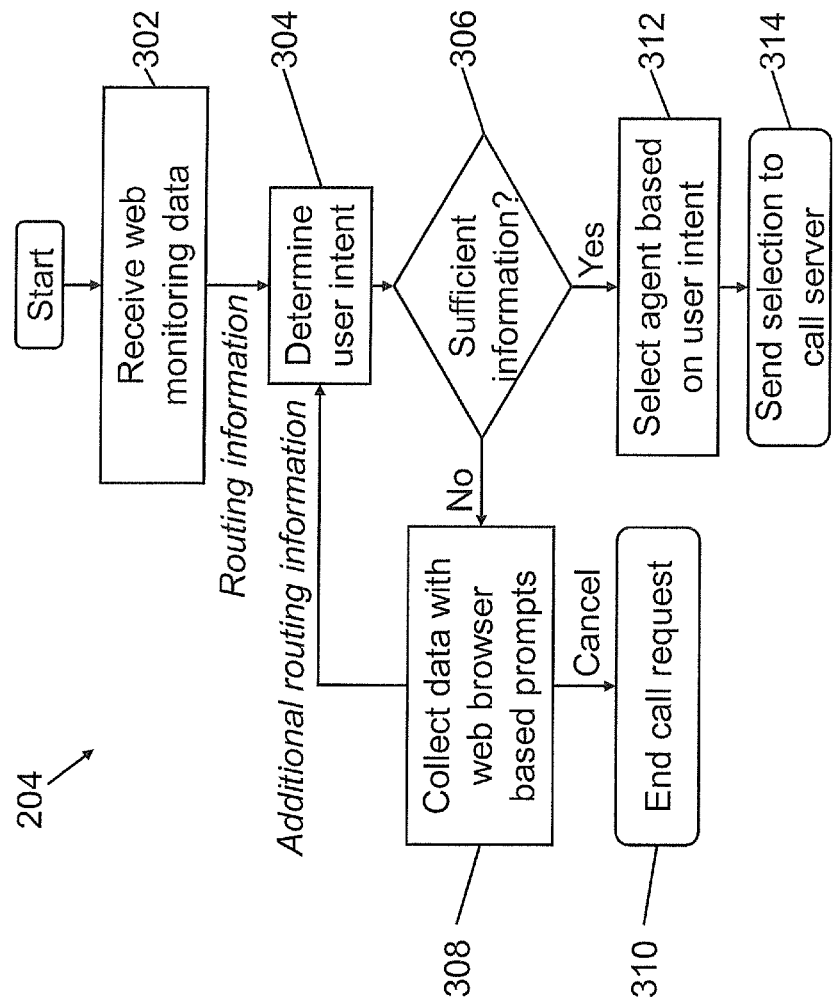
FIG. 3 is a flowchart of a process for identifying the appropriate agent for routing the call according to one exemplary embodiment of the present invention.

FIG. 3 is a more detailed flow diagram of step 204 of FIG. 2A for selecting an appropriate agent for routing an incoming call according to one exemplary embodiment of the invention. In step 302, the routing server 160 receives the routing information (e.g., the location of the user on the web app) from the web monitor 140 to assist in routing the call to an appropriate customer service representative. In step 304, the routing server 160 attempts to determine the user's intentions (e.g., purchasing a product, technical support, etc.). In step 306, the routing server 160 determines if the routing information is sufficient to determine the user's intent. If there is sufficient information, the routing server selects an appropriate agent in step 312, and information identifying the selected agent such as, for example, an agent identifier, telephone number, and/or IP address is sent in step 314 to the WebRTC/call server 110.

Referring again to step 306, if the routing server determines that the information received is insufficient for routing the call, additional routing information may be collected in step 308 from the website visitor. According to one exemplary embodiment, the routing server invokes the OOB application server 130 for obtaining the additional information. In one exemplary embodiment of the present invention, the OOB application server 130 displays one or more prompts (e.g., web forms or a series of prompts in a wizard) via an OOB channel to obtain the additional information. For example, a webpage may be displayed to the website visitor inquiring additional details on the call, such as, for example, the reason for the call, a particular language that is preferred, and the like.

According to one exemplary embodiment, the OOB application server 130 provides one or more OOB channels of communication within the browser in addition to (e.g., concurrently with) the real-time communication channel (e.g., the WebRTC connection).

According to one exemplary embodiment, the OOB application server 130 forwards the additional information to the routing server 160 or to the call server 114 to route the call to the appropriate customer service representative.

In embodiments of the present invention which include the web monitor 140, the one or more prompts for additional information may be selected based on the sufficiency of the information determined by the web monitor 140. For example, the web monitor 140 may determine that a user is interested in obtaining product support because the user has been browsing troubleshooting pages. However, in some circumstances the web monitor 140 may not have sufficient information to determine the particular product that the user is having issues with. As such, when the user makes a request to establish a real-time communication channel with a customer service representative, the out-of-band application server 130 may first prompt the user to indicate that it believes that the user is looking for customer support and may ask the user to identify a product from a list of products that the user would like help with.

According to one exemplary embodiment of the invention, the session identifier transmitted with the request for a WebRTC call is used to associate the website user with the particular session of the web application, the user's call request, and the user's responses to the web-browser based prompts.

The additional routing information may be combined with the previously collected routing information and reassessed in step 304 to determine if there is sufficient information to determine a user's intentions. The process may be repeated until sufficient information is received. The user may also choose to cancel the call request rather than to continue to answer questions via the web prompt, in which case the call request is ended in step 310.

Figure 4:
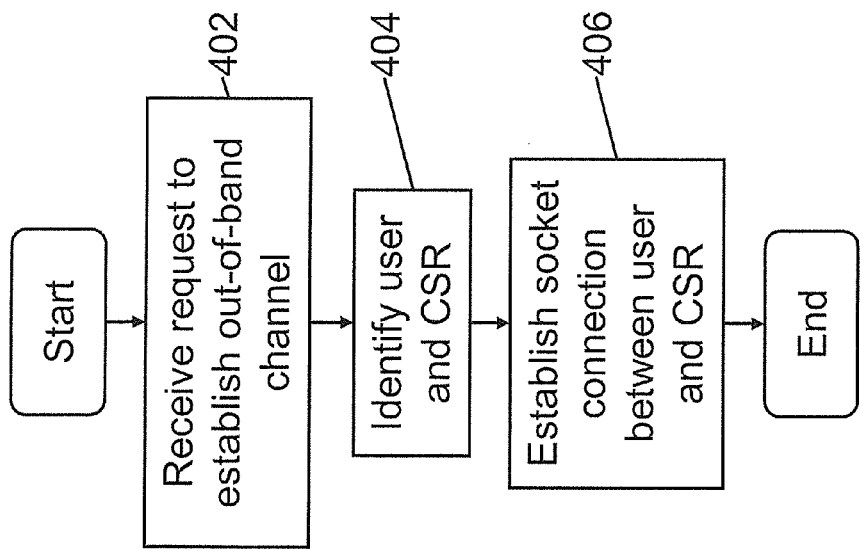
FIG. 4 is a flow diagram illustrating a process for establishing an out-of-band channel according to one exemplary embodiment of the present invention.

FIG. 4 is a flow diagram of a process for establishing an OOB channel connection between the customer end-user device 12 and the agent device 112 according to one exemplary embodiment of the invention. According to one exemplary embodiment, the one or more out-of-band channels may be associated with the session identifier associated with the corresponding browser-based real-time communication channel established as described, for example, with respect to FIGS. 2A and 2B. As discussed above, the out-of-band information may include, but is not limited to, text chats, screen sharing, shared documents, an inline frame ("iframe") for displaying web pages, and the like.

The out-of-band application server 130 receives request to establish an out-of-band channel in step 402. Either the user or the customer service representative (CSR) may make this request via their web browsers on their end-user devices and the out-of-band channel may be activated at the contact center. The request may identify one or more types of out-of-band channels (e.g., text chat, screen sharing, etc.) to be established. The out-of-band application server 130 also uses session identifiers to identify 404 the user and the CSR to be connected. The out-of-band application server 130 then establishes a connection (e.g., a WebSocket connection) between the user and the CSR using their respective session identifiers. This connection can be used to provide a channel for communicating the out-of-band information between the user and the CSR.

As described above, according to one exemplary embodiment of the present invention, the out-of-band channels and out-of-band information are used to supplement the "in-band" WebRTC-based voice and/or video communication channel, by providing additional communication channels such as text chat, screen sharing, and the like.

In some embodiments of the present invention, the party (e.g., the user or the CSR) not requesting the out-of-band channel may be prompted to confirm or reject the request to establish the out-of-band channel. In addition, in some embodiments of the present invention, separate connections (e.g., separate WebSocket connections) are established between the user and the CSR (e.g., the web browsers used by the user and the CSR) for each type of out-of-band channel, or some or all of these connections can be shared by the types of out-of-band channels used.

Figure 5A:
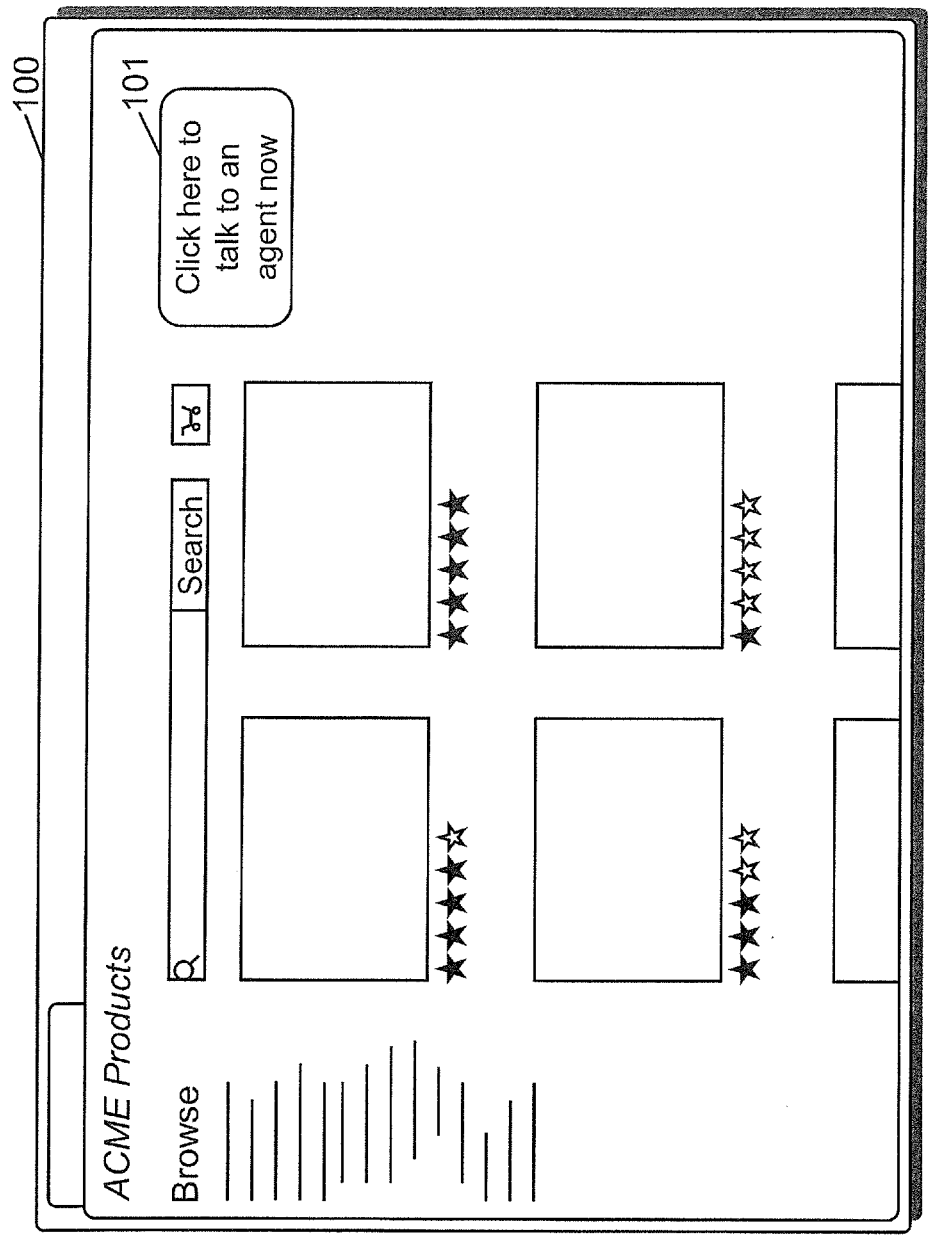
FIG. 5A is a schematic diagram of a browser window on a customer end-user device according to one exemplary embodiment of the present invention.

FIG. 5A is an exemplary screen shot of an exemplary browser window 100 displayed on the customer end-user device 12 where a customer using the customer end-user device 12 is shopping on the "ACME Products" website according to one exemplary embodiment of the present invention. After perusing the website, the user may want to speak to a customer service representative to obtain information or to ask for assistance in regard to a product or service being viewed by the user. According to one exemplary embodiment, the website provides a button 101 to initiate a request for a WebRTC call with the related contact center to speak with an agent. In other embodiments, the opportunity to establish a call may be indicated with a pop-up window, an overlay, or another object on the web page.

In the illustrated example, a request to establish a WebRTC call is transmitted by the browser 111 in response to the user's selection of the button 101. The established WebRTC call between the website visitor and an agent may be audio only, or audio and video. FIG. 3B is an exemplary screen shot of a browser window 100 with a pop-up window 102 displaying a real-time video call with an agent.

Figure 6A:
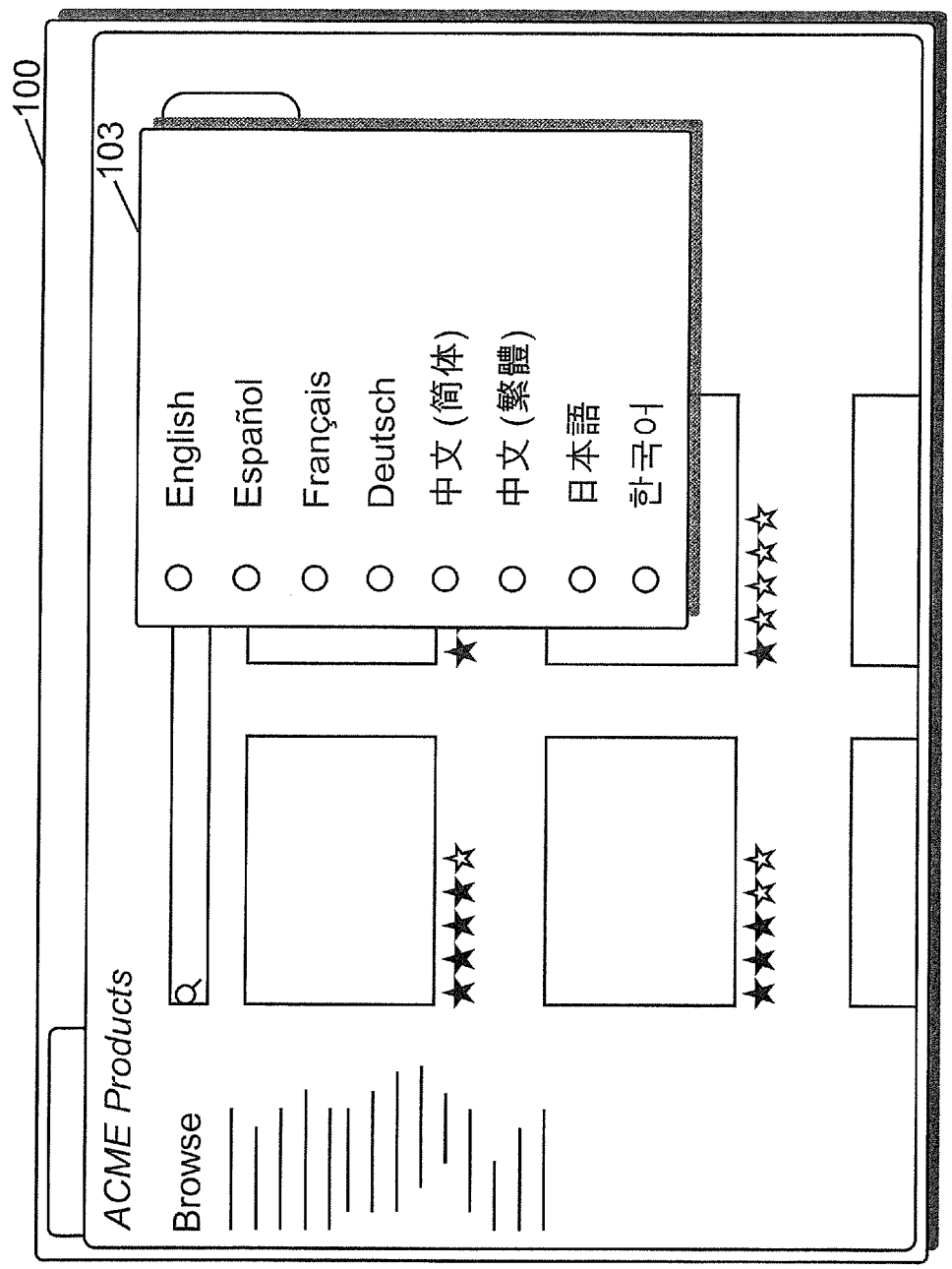
FIGS. 6A and 6B are schematic diagrams of browser windows with pop-up windows displaying requests for additional information from a customer, according to one exemplary embodiment of the present invention.
Figure 6B:
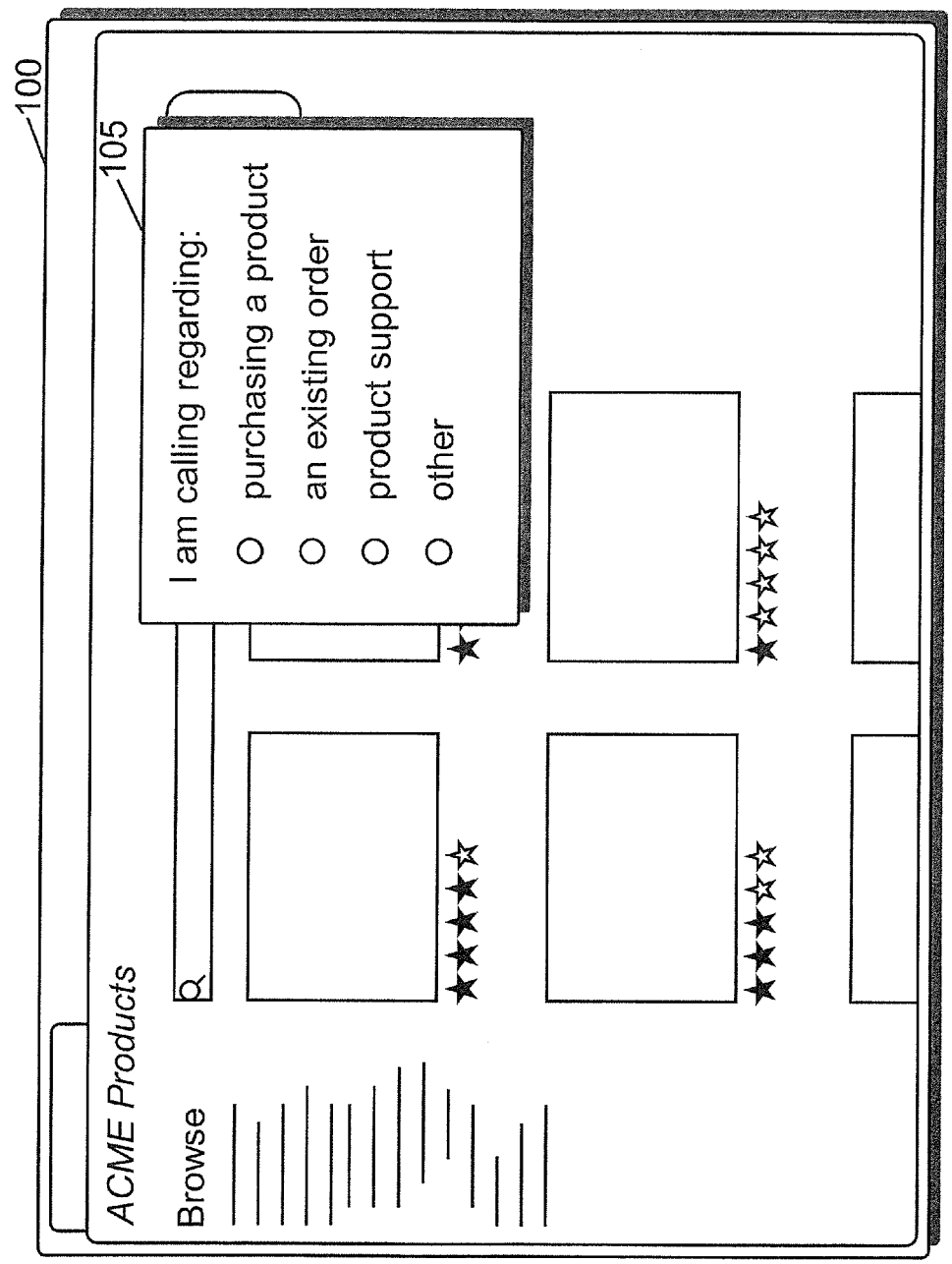

FIGS. 6A and 6B are exemplary screen shots of pop-up windows 103, 105 displayed for requesting additional information from the website visitor according to one exemplary embodiment of the invention. The pop-up windows may be used to prompt the user to select from a choice of languages, to indicate whether the call relates to sales, support, or other customer service, and/or to identify a category of products to which the call relates.

Figure 5B:
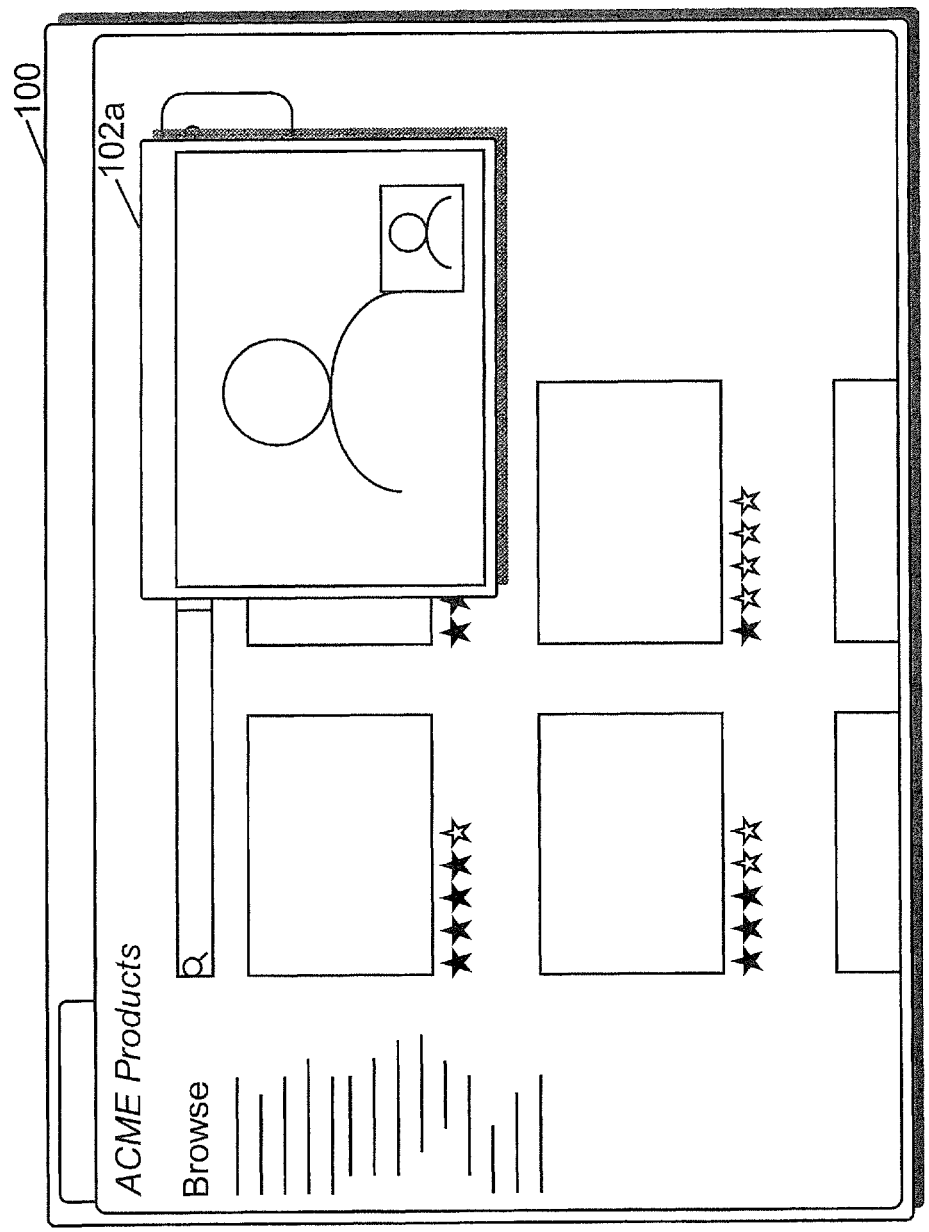
FIG. 5B is a schematic diagram of a browser window with a pop-up window displaying a real-time video call with an agent according to one exemplary embodiment of the present invention.
Figure 7:
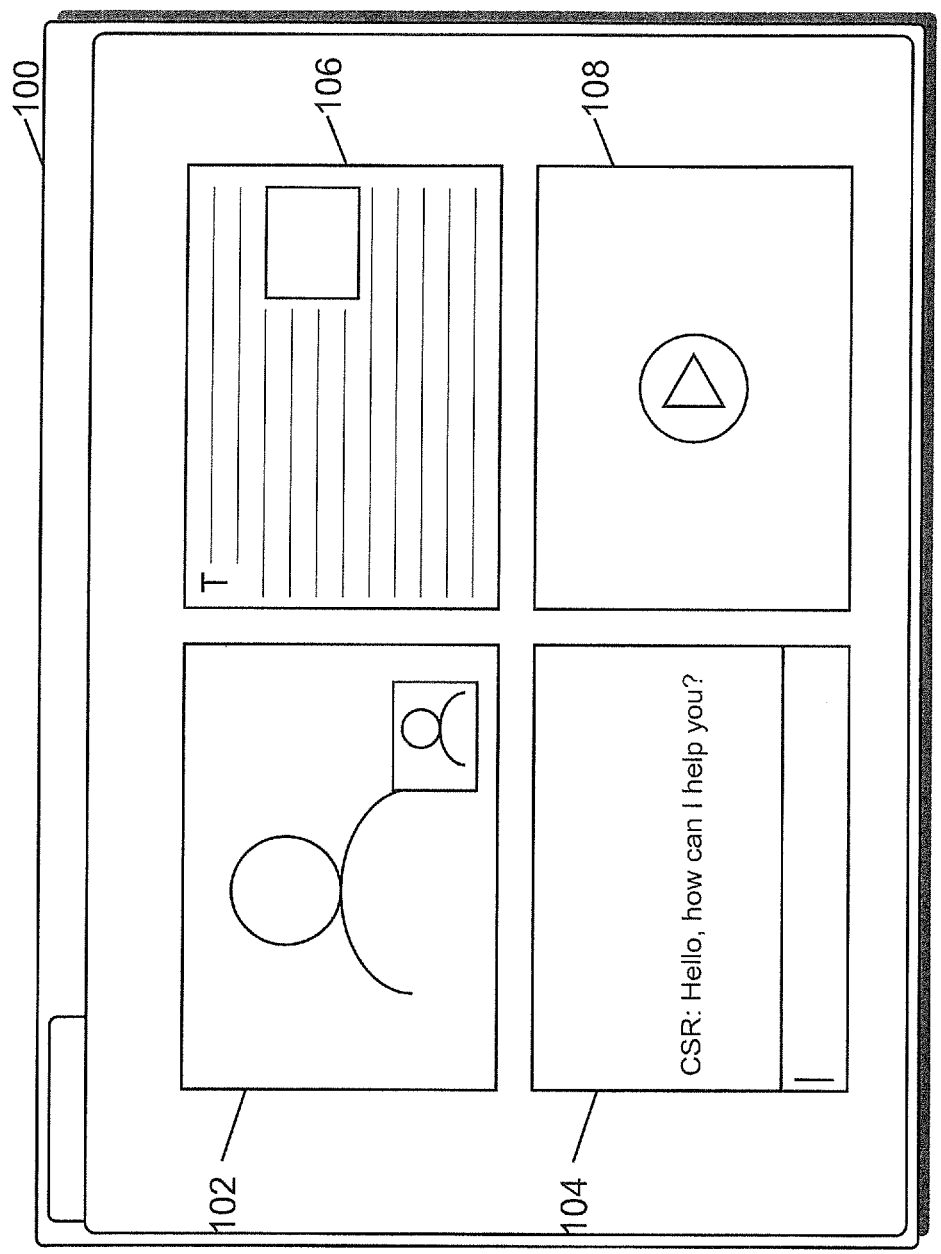
FIG. 7 is a schematic diagram of a browser window displayed by the end-user device of a customer engaged in a communication session with a customer service representative and with a plurality of out-of-band channels according to one exemplary embodiment of the present invention.

FIG. 7 is an exemplary screen shot of a browser window 100 displayed by the end-user device 12 of a customer engaged in a communication session with a customer service representative and with a plurality of out-of-band channels according to one exemplary embodiment of the present invention. In the example of FIG. 7, a user's browser window may include a plurality of sub-windows 102-108, where these sub-windows provide additional out-of-band information and communications channels including, without limitation, a video chat window 102, a text chat window 104, a document viewer window 106, and a video window 108. Embodiments of the present invention are not limited to the listed windows and may include other windows for displaying other types of content such as, for example, a digital "whiteboard" for drawing diagrams, displaying images, displaying billing information, and displaying a live view of a customer service representative's computer screen, or a portion thereof, for demonstrating the use of a product or service, or the like. In addition, as shown in the example of FIG. 5B, in some embodiments of the present invention, a sub-window 102a may float in a separate browser window.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, in some embodiments of the present invention may provide multi-party calls involving, for example, multiple agents interacting with a customer over WebRTC and the OOB communication channels, call transfer between agents, supervisor silent monitoring or whisper coaching (e.g., supervisor speaking to the agent without the customers being able to listen in) are also available and end users or customers may be able to conference in other parties via WebRTC.

While embodiments of the present invention illustrate a call server and routing calls via the call server, in some embodiments of the present invention, customer service representatives communicate with users directly via WebRTC connections without an intervening call server. In other embodiments a SIP server is included in the loop for purposes of call control, such as transfer, conferencing, or supervisors silent monitoring and whisper coaching.

In addition, while embodiments of the present invention have been described above in the context of WebRTC, other embodiments of the present invention may use other web-browser based conferencing technologies such as CU-RTC-WEB that similarly do not depend on the installation of additional plugins such as Adobe® Flash® or the Google® Talk plugin.

What is claimed is:

1. A method for connecting a website user to a contact center, the method comprising:
    establishing, by a processor, a communication channel between a user and an agent of the contact center, the communication channel comprising a voice communication channel, the establishing the communication channel comprising receiving a call request via a website accessed by the user via a web browser, the call request comprising a session identifier;
    establishing, by the processor, a supplemental channel between the web browser of the user and the contact center based on the session identifier, wherein the supplemental channel is associated with the session identifier;
    displaying, by the processor, the supplemental channel and the website concurrently in the web browser of the user;
    receiving, by the processor, data from the user via the supplemental channel;
    transmitting to the agent, by the processor, the data received from the user via the supplemental channel; and
    storing, by the processor, the data received via the supplemental channel in association with the communication channel.

2. The method of claim 1, wherein the communication channel is established with a media engine integrated into the web browser.

3. The method of claim 1, wherein text-based chat is conducted between the user and the agent.

4. The method of claim 1, wherein screen sharing is conducted between the user and the agent.

5. The method of claim 1, wherein information is transferred between the user and the agent using web forms.

6. The method of claim 1, wherein the establishing the communication channel comprises requesting information via the supplemental channel.

7. The method of claim 6, wherein the requesting information comprises transmitting a web-based form to a web browser associated with the session identifier.

8. The method of claim 1, wherein the supplemental channel comprises a socket connection.

9. The method of claim 1, wherein the establishing the communication channel comprises:
    receiving information from the website user via the supplemental channel; and
    identifying the agent of the contact center based on the information.

10. The method of claim 9, wherein the information comprises a response to a web-based form.

11. A system for providing supplemental media and data exchange in a contact center, the system comprising:
    a call server configured to establish a plurality of communication channels between a plurality of users and a plurality of agents of the contact center, wherein the call server is configured to receive a plurality of call requests via a website accessed by the users via a plurality of web browsers, each of the call requests comprising a corresponding session identifier;
    a routing server configured to route the plurality of requests for connections to the plurality of agents of the contact center;
    a supplemental application server configured to:
        establish a plurality of supplemental communication channels between the users and the contact center, wherein the supplemental channels are associated with the corresponding session identifier of a corresponding one of the call requests;

display the supplemental channels and the website concurrently in the web browsers of the users;

receive data from the user via the supplemental channel; and transmit to the agent the data received from the user via the supplemental channel;

a database for storing the data received via a supplemental channel of the supplemental channels in association with a communication channel of the communication channels.

12. The system of claim 11, wherein the communication channel is established with a media engine integrated into a web browser used by one or more of the users.

13. The system of claim 11, wherein each of the communication channels is associated with corresponding ones of the supplemental communication channels and each of the communication channels and its corresponding supplemental communication channels are associated with a session identifier, the session identifier being distinct from a session identifier associated with another of the communication channels.

14. The system of claim 11, wherein the supplemental application server is configured to provide a text-based chat channel between the user and the agent.

15. The system of claim 11, wherein the supplemental application server is configured to provide a screen sharing channel between the user and the agent.

16. The system of claim 11, wherein the supplemental application server is configured to receive responses to web forms from the user.

17. The system of claim 11, wherein the routing server is further configured to route requests to the agents using routing information received from the supplemental application server.

18. The system of claim 17, wherein the supplemental application server is further configured to receive routing information from a plurality of web browsers associated with the users via the supplemental communication channels.

19. The system of claim 11, wherein each of the supplemental channels comprises a socket connection.

20. The method of claim 1, wherein the establishing, by the processor, a supplemental channel between the user and the contact center based on the session identifier comprises identifying the user and the agent based on the session identifier.

* * * * *